US00RE46780E

(19) United States
(12) Reissued Patent
Anderson et al.

(10) Patent Number: US RE46,780 E
(45) Date of Reissued Patent: Apr. 10, 2018

(54) HIGH DENSITY PATCHING SYSTEM FOR CABLE AND OPTICAL FIBER

(71) Applicant: CommScope Technologies LLC, Hickory, NC (US)

(72) Inventors: Timothy W. Anderson, Omaha, NE (US); Richard L. Case, Omaha, NE (US)

(73) Assignee: CommScope, Inc. of North Carolina, Hickory, NC (US)

(21) Appl. No.: 15/160,511

(22) Filed: May 20, 2016

Related U.S. Patent Documents

Reissue of:
(64) Patent No.: 8,731,361
Issued: May 20, 2014
Appl. No.: 12/793,728
Filed: Jun. 4, 2010

U.S. Applications:
(60) Provisional application No. 61/185,018, filed on Jun. 8, 2009.

(51) Int. Cl.
*G02B 6/00* (2006.01)
*G02B 6/44* (2006.01)

(52) U.S. Cl.
CPC ..... *G02B 6/4455* (2013.01)

(58) Field of Classification Search
CPC ..... G02B 6/4455; G02B 6/4452; H04Q 1/06; H04Q 1/064; H04Q 1/131
See application file for complete search history.

(56) References Cited

U.S. PATENT DOCUMENTS 5,071,220 A * 12/1991 Ruello et al. ..... 385/135
5,883,995 A 3/1999 Lu
5,984,531 A 11/1999 Lu
6,076,973 A 6/2000 Lu
(Continued)

FOREIGN PATENT DOCUMENTS

CN 201218861 4/2009
CN 201218861 Y 4/2009
WO WO 99/42881 8/1999

OTHER PUBLICATIONS

"Systimax InstaPATCH System," a seven page brochure by Systimax Solutions, a CommScope Company, Aug. 2004.
(Continued)

*Primary Examiner* — Deandra Hughes
(74) *Attorney, Agent, or Firm* — Muncy, Geissler, Olds & Lowe, P.C.

(57) ABSTRACT

A communication patching system includes a platform configured to support a plurality of cables and a first panel pivotably mounted to the platform, the first panel having at least one holder for securing communications adapters to the first panel. A first set of communications adapters is connected to the platform, and a second set of communications adapters mounted in the at least one holder. The first panel is pivotable between a first position in which the second set of communications adapters is spaced from the first set of communications adapters by a first distance and a second position in which the second set of communications adapters is spaced from the first set of communications adapters by a second distance greater than the first distance.

28 Claims, 10 Drawing Sheets

(56) References Cited

U.S. PATENT DOCUMENTS

| | | | | |
|---|---|---|---|---|
| 6,263,141 | B1 | 7/2001 | Smith | G02B 6/4455 385/135 |
| 6,296,398 | B1 | 10/2001 | Lu | |
| 6,438,310 | B1 | 8/2002 | Lance | |
| 6,471,416 | B2 | 10/2002 | Lu | |
| 6,504,988 | B1 | 1/2003 | Trebesch | G02B 6/4455 385/135 |
| 6,591,051 | B2 | 7/2003 | Solheid | |
| 6,748,155 | B2 | 6/2004 | Kim | |
| 6,910,807 | B2 | 6/2005 | Lu | |
| 6,937,807 | B2 | 8/2005 | Franklin | |
| 6,944,389 | B2 | 9/2005 | Giraud | G02B 6/4455 385/134 |
| 6,968,111 | B2 | 11/2005 | Trebesch | |
| 7,068,907 | B2 | 6/2006 | Schray | |
| 7,079,744 | B2 | 7/2006 | Douglas | |
| 7,120,348 | B2 | 10/2006 | Trebesch | |
| 7,316,324 | B1 * | 1/2008 | Myllykangas | 211/16 |
| 7,654,749 | B2 | 2/2010 | Lu | |
| 7,715,680 | B2 * | 5/2010 | Krampotich | 385/135 |
| 7,769,266 | B2 * | 8/2010 | Morris | 385/135 |
| 7,874,738 | B2 | 1/2011 | Lu | |
| 7,903,925 | B2 | 3/2011 | Cooke et al. | |
| 7,945,135 | B2 | 5/2011 | Cooke et al. | |
| 8,135,257 | B2 | 3/2012 | Cooke et al. | |
| 8,184,938 | B2 | 5/2012 | Cooke et al. | |
| 8,231,190 | B2 * | 7/2012 | Ertz et al. | 312/402 |
| 8,249,410 | B2 * | 8/2012 | Andrus | G02B 6/4452 385/135 |
| 8,285,104 | B2 | 10/2012 | Cooke et al. | |
| 8,290,333 | B2 | 10/2012 | Cooke et al. | |
| 8,301,004 | B2 | 10/2012 | Cooke et al. | |
| 8,326,107 | B2 | 12/2012 | Cooke et al. | |
| 8,452,148 | B2 | 5/2013 | Cooke et al. | |
| 8,538,226 | B2 * | 9/2013 | Makrides-Saravanos | G02B 6/4455 385/135 |
| 8,559,785 | B2 | 10/2013 | Cooke et al. | |
| 8,620,130 | B2 | 12/2013 | Cooke et al. | |
| 8,625,950 | B2 * | 1/2014 | Beamon | G02B 6/4452 312/222 |
| 8,712,206 | B2 * | 4/2014 | Cooke | G02B 6/4452 385/134 |
| 8,944,411 | B2 | 2/2015 | Cooke et al. | |
| 9,020,320 | B2 | 4/2015 | Cooke et al. | |
| 2002/0125800 | A1 | 9/2002 | Knudsen | |
| 2006/0275008 | A1 | 12/2006 | Xin | |
| 2007/0190815 | A1 * | 8/2007 | Sampson et al. | 439/49 |
| 2008/0132288 | A1 * | 6/2008 | Misawa | 455/566 |
| 2009/0067800 | A1 * | 3/2009 | Vazquez et al. | 385/135 |
| 2009/0245743 | A1 * | 10/2009 | Cote et al. | 385/135 |
| 2010/0322583 | A1 | 12/2010 | Cooke et al. | |
| 2013/0251326 | A1 | 9/2013 | Cooke et al. | |
| 2015/0185429 | A1 | 7/2015 | Cooke et al. | |

OTHER PUBLICATIONS

"Systimax G2 Fiber-Optic Connectivity Solution," a ten page brochure by Systimax Solutions, a CommScope Company, Jun. 2005.

"Systimax InstaPATCH Plus Modular Shelf and DM2 Modules," a three page brochure by Systimax Solutions, a CommScope Company, Jun. 2005.

"Systimax InstaPATCH Plus Connectivity System," a ten page brochure by Systimax Solutions, a CommScope Company, May 2006.

"Systimax InstaPATCH Plus Modular Shelf and DM2 Modules," a four page brochure by Systimax Solutions, a CommScope Company, Oct. 2007.

* cited by examiner

HIGH DENSITY PATCHING SYSTEM FOR CABLE AND OPTICAL FIBER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This is a reissue application of U.S. Pat. No. 8,731,361.*

The present application claims the benefit of U.S. Provisional Patent Application No. 61/185,018, filed Jun. 8, 2009, the entire contents of which is hereby incorporated by reference.

BACKGROUND OF THE INVENTION

1. Field of the Invention

The present invention relates to storage/organizing devices used in networking environments. More particularly, the present invention relates to a communications patching system that includes a support for communications lines and one or more panels pivotably mounted to the support, the panels including holders for communications adapters.

2. Description of the Related Art

In communication cabinets and racks, a multitude of cables are interconnected to one another via splices and connectors, such as adapters in the case of fiber optic cables and jacks in the case of copper conductor cables. A cable organization unit having a tray or shelf or similar platform is a convenient way to mount cabling devices, such as splice holders, adapters and slack storage devices (e.g., clips, guides, spools). The cabling devices may be mounted to the shelf in a highly organized fashion. Optionally, the cabling devices may be withdrawn from a housing mounted to the rack or cabinet via a sliding action of the shelf to provide for easy access and manipulation of the cabling devices on a rear portion of the shelf by a technician. The front portion of the shelf typically presents a bulkhead populated with adapters (in the case of fiber optic connections) or jacks (in the case of copper cables, such as twisted pair cables or coaxial cables).

Such cable organization units are generally known in the background art and more details of such devices may be seen in U.S. Pat. Nos. 7,120,348; 7,079,744; 7,068,907; 6,968,111; 6,944,389; 6,937,807; 6,748,155; 6,591,051; 6,504,988; 6,438,310; and 6,263,141, each of which is herein incorporated by reference.

It is desirable to provide fiber optic distribution equipment/copper cable distribution equipment, like patch panels, with increased connector port density. "Density" refers to the number of locations, or ports, per unit volume or unit area for providing connections. Many shelves are configured to a standard size. A standard height of 1.75 inches is known in the art as a "rack unit" or "U". For example, a 2 U shelf would have a height of 3.5 inches. If a 2 U shelf had 96 connections, the shelf would have a 48 connections/U density.

On a standard shelf in accordance with the background art, the higher the connection/U density, the more difficult it is to make connections and disconnections, and labeling of ports is more closely spaced and difficult to understand and view. However, in some network environments (such as storage area network (SAN) environments), there is a need for a higher density adapter/jack arrangement on the bulkhead of the shelf. The higher density adapter/jack arrangement also needs to be sized to be installed on a standard sized shelf of a traditional rack and/or cabinet. One such application is in cabinet patching support of high density SAN switching hardware that typically takes up most of the available rack space. A patch panel with higher density than traditional patch panels would have value and use in this application.

Fiber optic patch panel shelves typically include metal drawer type shelves in a 1 U or greater size (e.g., 1 U, 2 U, 3 U and 4 U are typical sizes of design configurations). The shelves are populated with fiber optic adapters in panels, have space for behind-the-bulkhead-wall cable management, options for splicing, support for pre-terminated hardware, and a trough in the front for fiber optic patch cord management. There are available fixed and sliding versions of these shelves. The sliding versions typically use drawer type slides to allow the shelf to slide out of the front plane of the equipment rack. These shelves may include modular cable organizing products pre-installed at the factory or connection features to accommodate modular cable organizing products installed in the field.

The traditional fiber shelves have typically been configured with a single patch panel or multiple modular patch panels on the front patching side of a bulkhead of the shelf in either a single continuous plane or two angled planes to ease patching. With this configuration, total density of connectors/adapters has been limited to the available space in the rack unit that the shelf resides in, and by the ergonomics associated with installing and removing connectors from the fiber adapters/cable jacks on the patch panel. Specifically, if the adapters are placed too closely together it becomes difficult to grasp a connector to insert it into or remove it from the adapter. It would therefore be desirable to provide a communications patching system that allowed adapters to be mounted in closer proximity than has heretofore been practicable while providing sufficient room at the adapters to allow for the easy connection and disconnection of optical fibers and other cables.

SUMMARY OF THE INVENTION

These problems and others are addressed by embodiments of the present invention. One embodiment of the present invention is a high density fiber optic shelf that improves the ergonomic issues by using pivoting adapter panels that allow full utilization of the space located in the rack unit. This provides the potential for higher fiber port density than traditional patch panels.

One embodiment of the invention employs a standard 1 U type shelf tray with three rows of adapter patch panels that are able to pivot up out of the plane of the rack unit. Other multiple rack unit versions are possible, which could include more than three rows of adapter patch panels. Each patch panel has its own trough for fiber patch cords on the front and a pivot feature inside the shelf to the rear of the "behind the wall" connectors. The pivot feature allows the top and middle position panels to be rotated up, with the top panel rotating more than the middle panel, creating a three tier stagger of the adapter positions. The vertical offset created by the rotated-up tiers gives access for jumper management. When the panels are pivoted down access to the jumpers would be difficult, but clearance is physically available for connector operation. In order to efficiently utilize the panel pivot up feature, the shelf can be a slide out type shelf and be used in the pulled-out position.

Additional features to make the ultra high density fiber shelf design more usable are pivot angle retention features, which hold the patch panel in the pivoted accessible position until released by the technician, removable patch panels, a modular preterminated patch panel design, and trough cover features for patch cord management.

According to one embodiment of the invention, a 1 U, 19 inch rack mountable fiber shelf has double the fiber port density of traditional shelves. Using the SC simplex adapter foot print for LC duplex adapters and the SC duplex adapter foot print for SC connectors the port density is 144 fiber (72 ports) LC and 72 fiber (36 port) SC. Hence, this goal is met when compared to traditional products of the background art.

One aspect of the invention provides a higher port/adapter density on the patch panels while maintaining easy access to the ports/adapters by technicians and easy labeling and viewing of labeling by technicians.

Another aspect of the invention comprises a communication patching system that includes a platform configured to support a plurality of cables and a first panel pivotably mounted to the platform, the first panel having at least one holder for securing communications adapters to the first panel. A first set of communications adapters is connected to the platform, and a second set of communications adapters is mounted in the at least one holder. The first panel is pivotable between a first position in which the second set of communications adapters is spaced from the first set of communications adapters by a first distance and a second position in which the second set of communications adapters is spaced from the first set of communications adapters by a second distance greater than the first distance.

A further aspect of the invention comprises a communication patching system that includes a rack and a tray slidably mounted in the rack, the tray having a bottom and an end edge and being configured to support a plurality of cables on the bottom. A first holder is provided that is configured to hold a first plurality of communications adapters on the tray, and a first panel is pivotably mounted to the tray, the first panel including a first portion overlying the tray and a second portion projecting past the end edge. A second holder is provided on the first panel that is configured to hold a second plurality of communications adapters, and the first panel is shiftable between a first position in which the second holder is spaced from the first holder by a first distance and a second position in which the second holder is spaced from the first holder by a second distance greater than the first distance.

An additional aspect of the invention comprises a communication patching system that includes a platform configured to support a plurality of cables and a first holder connected to the platform and configured to hold a first row of communications adapters, a first set of communications adapters being mounted to the first holder. A second holder is connected to the platform and is configured to hold a second row of communications adapters on top of the first holder, and a second set of communications adapters is mounted to the second holder. A mechanism is provided for moving the second row of communications adapters from a first position a first distance from the first row of communications adapters to a second position a second distance from the first row of communications adapters, the second distance being greater than the first distance, and a mechanism is provided for releasably holding the second row of communications adapters in the second position.

BRIEF DESCRIPTION OF THE DRAWINGS

These aspects of the invention and others will be better understood after a reading of the following detailed description together with the attached drawings wherein.

DETAILED DESCRIPTION

Figure 1:
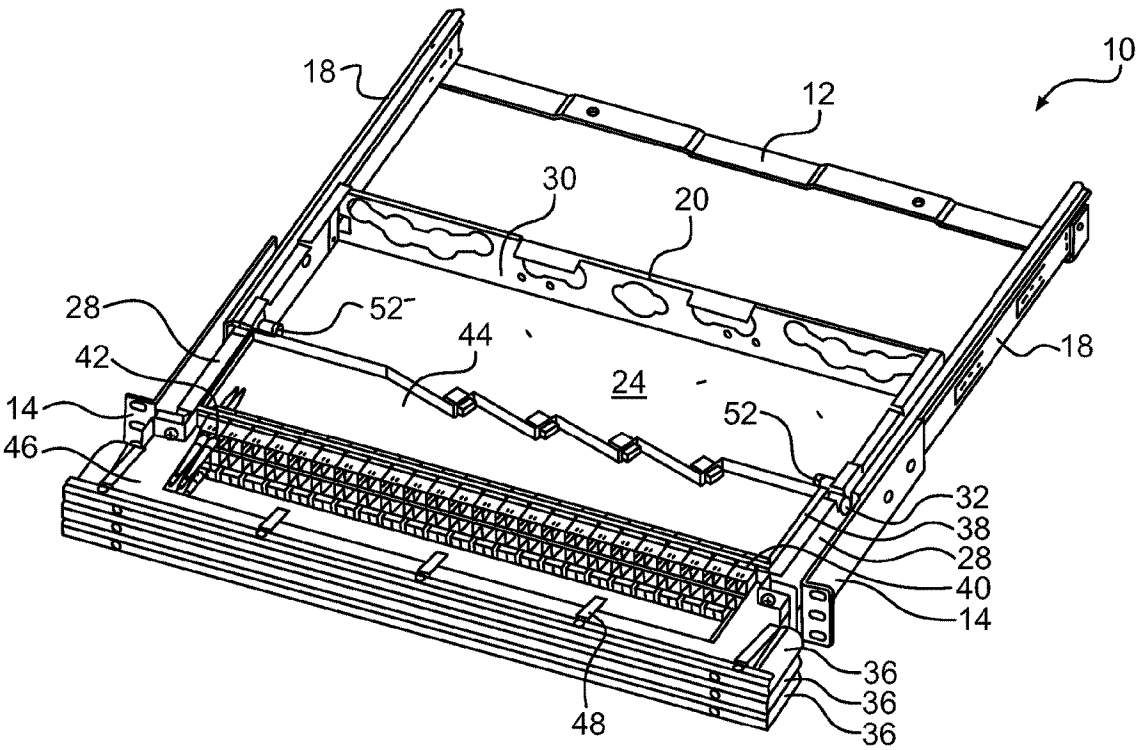
FIG. 1 is perspective view of a shelf for holding communications adapters in a rack according to an embodiment of the present invention, the shelf including a movable tray portion and a plurality of panels mounted on the tray, the tray portion being shown in a retracted position.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

As used herein the term "cables" is intended to describe structures for carrying signals such as, but not limited to, twisted pair cables, coaxial cables and fiber optic cables. Some embodiments of the present invention include showings and descriptions of fiber optic cables. These descriptions are not intended to be limiting, and the structures shown can be used with twisted pair cables, coaxial cables or optical fibers when the appropriate adapters/jacks are used.

FIG. 1 illustrates a shelf 10 according to an embodiment of the present invention that includes a rack-mountable support 12 having brackets 14 that connect to a standard-width rack 16 (FIG. 6) and having guides 18. A tray 20 includes side rails 22, shown in FIG. 2, that are received in guides 18 for slidably supporting tray 20 in rack 16 for drawer-like movement into and out of rack 16 as described hereinafter. Tray 20 has a bottom 24 that provides a platform for supporting cables, an end edge 26, first and second sidewalls 28, and a rear wall 30. Sidewalls 28 each include openings 31 supporting *first and second stops, like* first plungers 32 and second plungers 34 which first and second plungers 32, 34 are shiftable between first and second positions relative to sidewalls 28. Shelf 10 will generally include a cover and a plurality of cables on tray bottom 24; the cover has been removed in the drawings for clarity, and the cables are also not illustrated in many drawing figures for the same reason.

Figure 3:
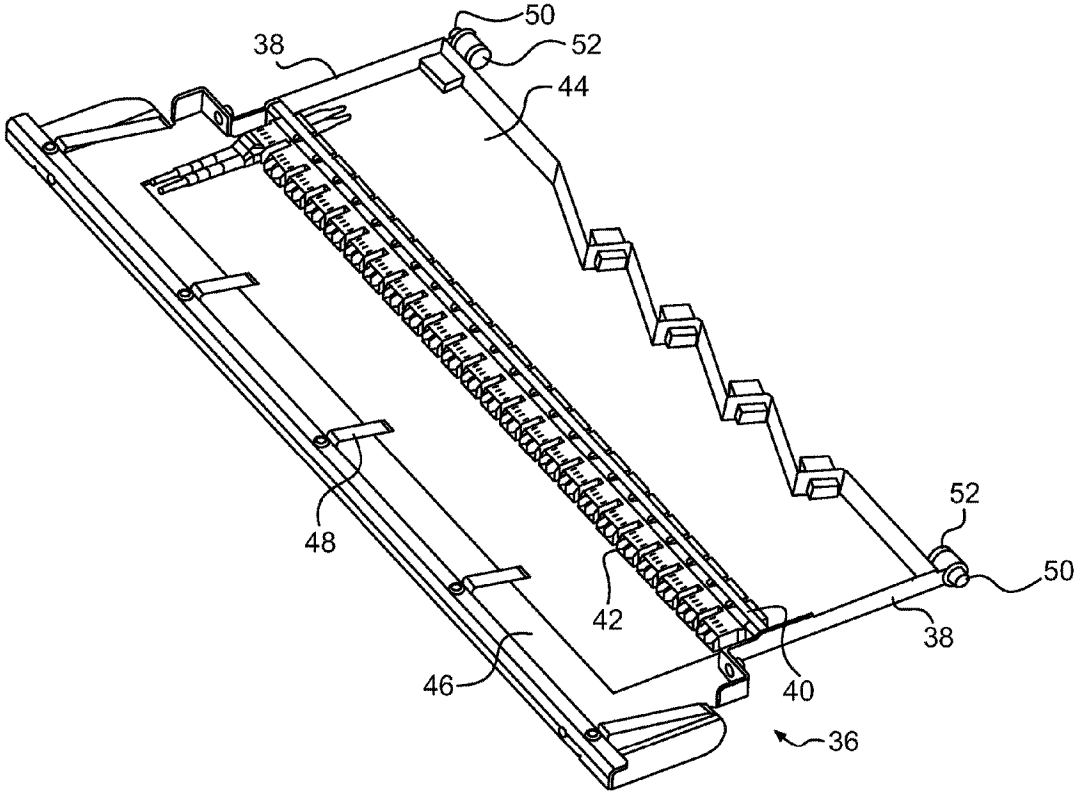
FIG. 3 is a perspective view of a single one of the panels of FIG. 1.

A plurality of panels 36, one of which is illustrated apart from tray 20 in FIG. 3, are mounted to sidewalls 28. The panels 36 are substantially identical, and the same reference numerals will be used to identify equivalent portions of the three panels. These panels 36 may be referred to herein as a "bottom," a "middle" and a "top" panel 36 based on their relationship to tray bottom 24, with the "bottom" panel 36 being the one closest to tray bottom 24. Each panel 36 includes first and second arms 38 and a bulkhead or holder 40 for a plurality of communications adapters 42 extending between the arms. The panels 36 may also include a floor 44 for supporting cables (not illustrated) near holder 40. First and second arms 38 overlie tray bottom 24, while the holder 40 is located generally above the end edge 26 of tray 20. A trough 46 extends from first and second arms 38 past end edge 26 and may include one or more fingers 48 or an optional cover (not illustrated) for securing cables (not illustrated) thereon.

The bottom panel 36 is supported by tray bottom 24 and may be fixed to the tray 20 or be pivotably mounted thereto. The middle panel 36 and top panel 36 are stacked above bottom panel 36 with the holders 40 of the three panels arranged in a vertical column. The first and second arms 38 of each of the middle and top panels 36 are pivotably connected to sidewalls 28 of trays 20 by a pivot pin 50, FIG. 3, on each of the first and second arms 38 which pivot pin 50 extends into a corresponding opening (not illustrated) in the sidewalls 28. Pivot pin 50 may be fixed or may be attached to a pull 52, illustrated in FIG. 3, which allows for the retraction of pivot pin 50 and the removal of the panel 36 from the tray. Middle panel 36 is connected to sidewalls 28 at a point between first plunger 32 and rear wall 30 of the tray 20. Top panel 36 is connected to sidewalls 28 at a point between second plunger 34 and rear wall 30 of the tray 20. These connection locations and the locations of the first and second plungers affect the positions of top and middle panels 36 discussed below.

Figure 4:
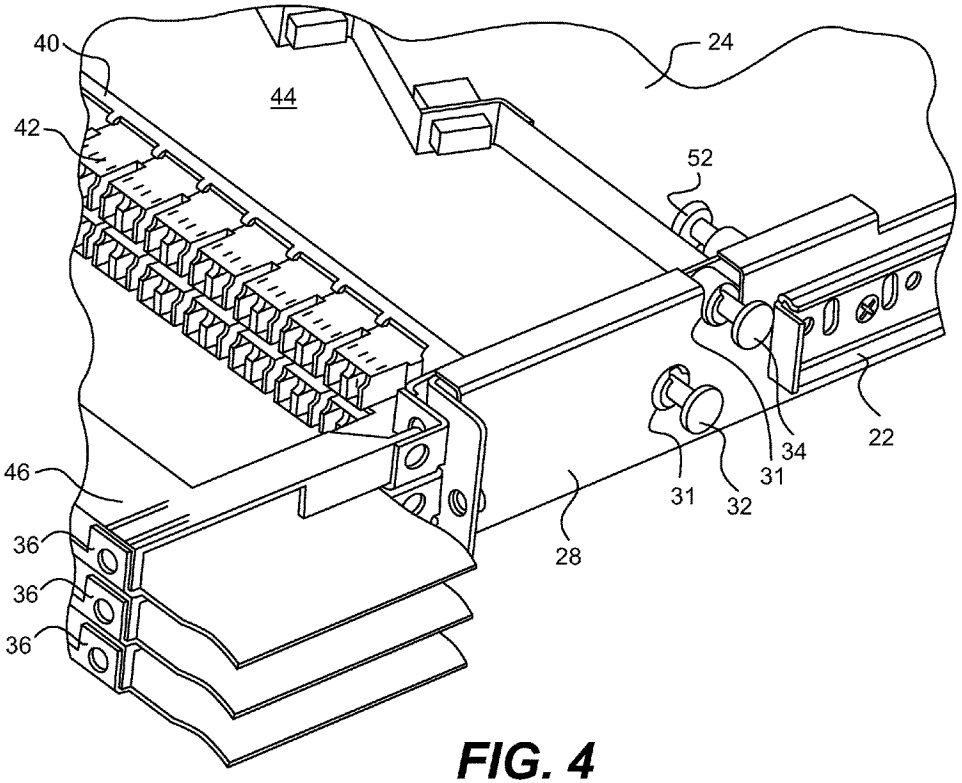
FIG. 4 is a perspective view of a portion of the tray of FIG. 1 showing plungers for holding two of the panels in raised positions, the panels being shown in a lowered position.
Figure 5:
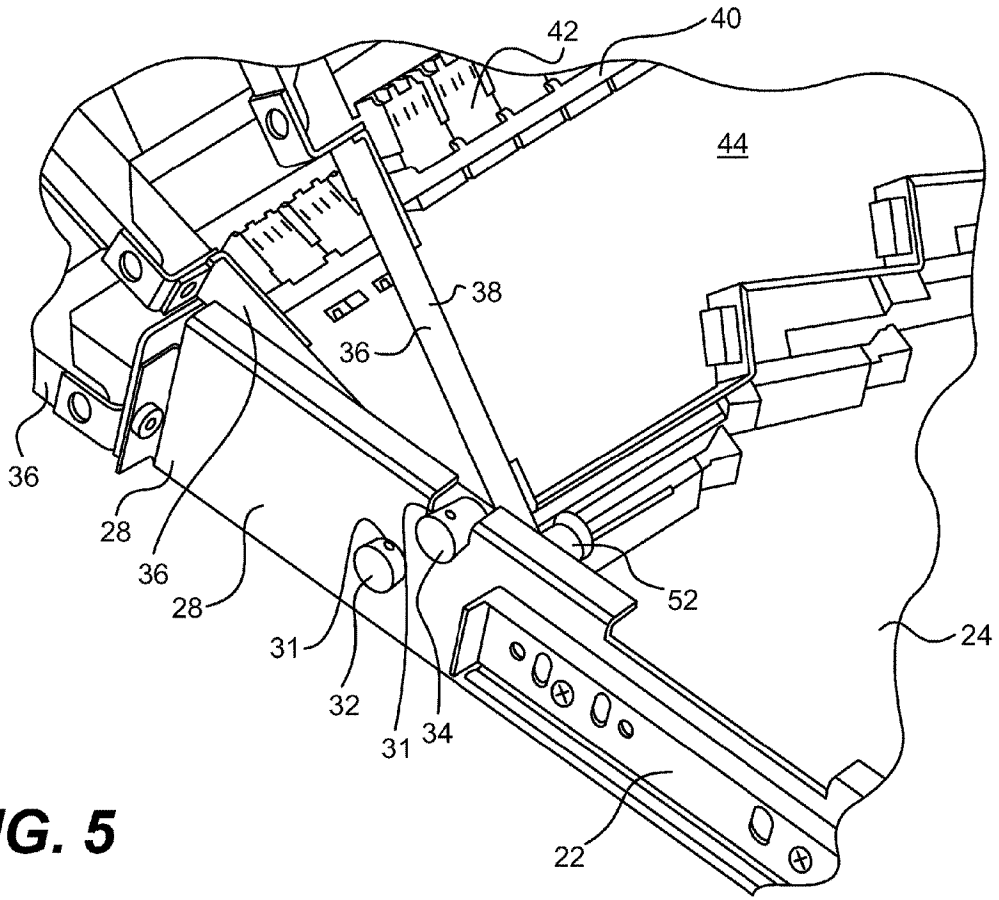
FIG. 5 is a perspective view of the tray portion of FIG. 4 showing two of the panels in raised positions.

FIG. 4 shows the bottom, middle and top panels 36 positioned in a stack with first plunger 32 and second plunger 34 in retracted positions. As illustrated in FIG. 5, top panel 36 may be pivoted away from middle panel 36 to a position above second plungers 34. Second plungers 34 may then be pressed inwardly over tray bottom 24 to extend beneath top panel 36 to support top panel 36 in a second or raised position when it is lowered onto the second plungers 34. In a similar manner, middle panel 36 may be pivoted away from bottom panel 36 to a position above first plungers 32. First plungers 32 may then be pressed inwardly over tray bottom 24 to extend beneath middle panel 36 to support middle panel 36 on the first plungers 32 when the middle panel 36 is lowered thereon. When the first plungers 32 are retracted, the middle panel 36 can be lowered toward or onto bottom panel 36, and when the second plungers 34 are retracted, the top panel 36 can be lowered toward or onto middle panel 36.

Figure 2:
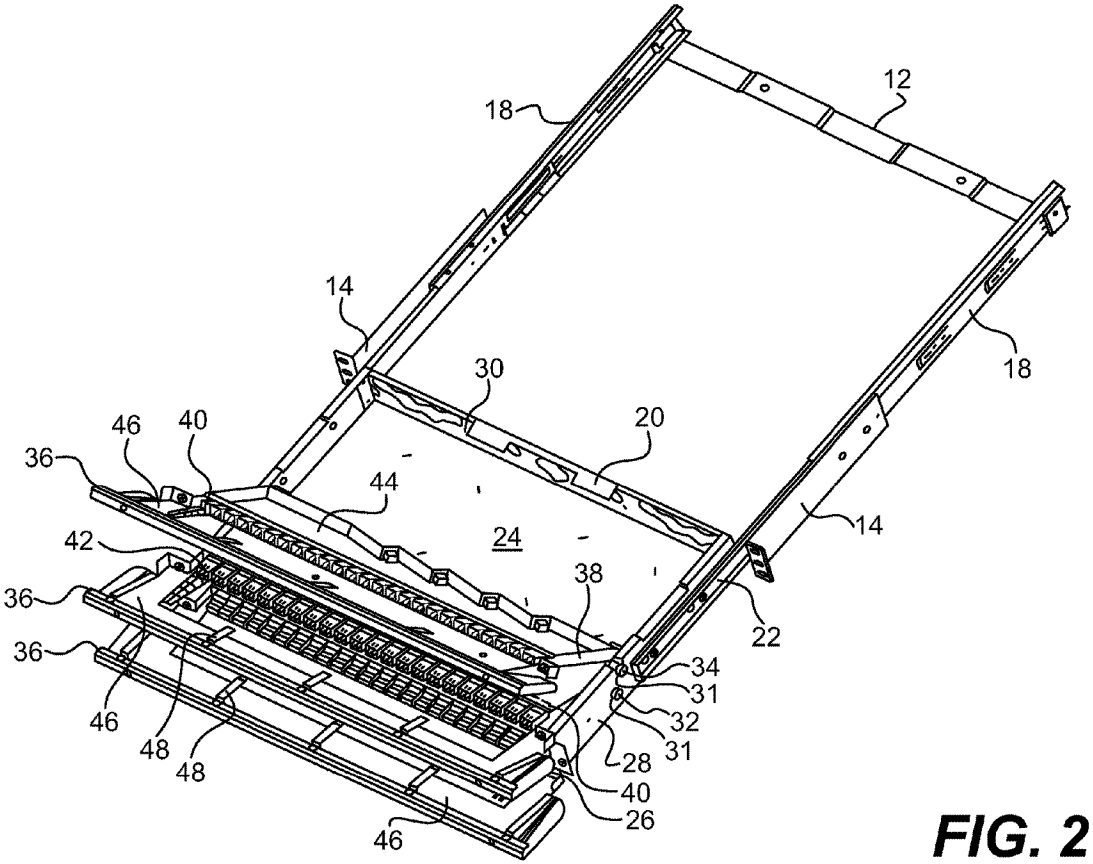
FIG. 2 is a perspective view of the shelf of FIG. 1 with the tray in an extended position and two of the panels pivoted away from the tray.
Figure 6:
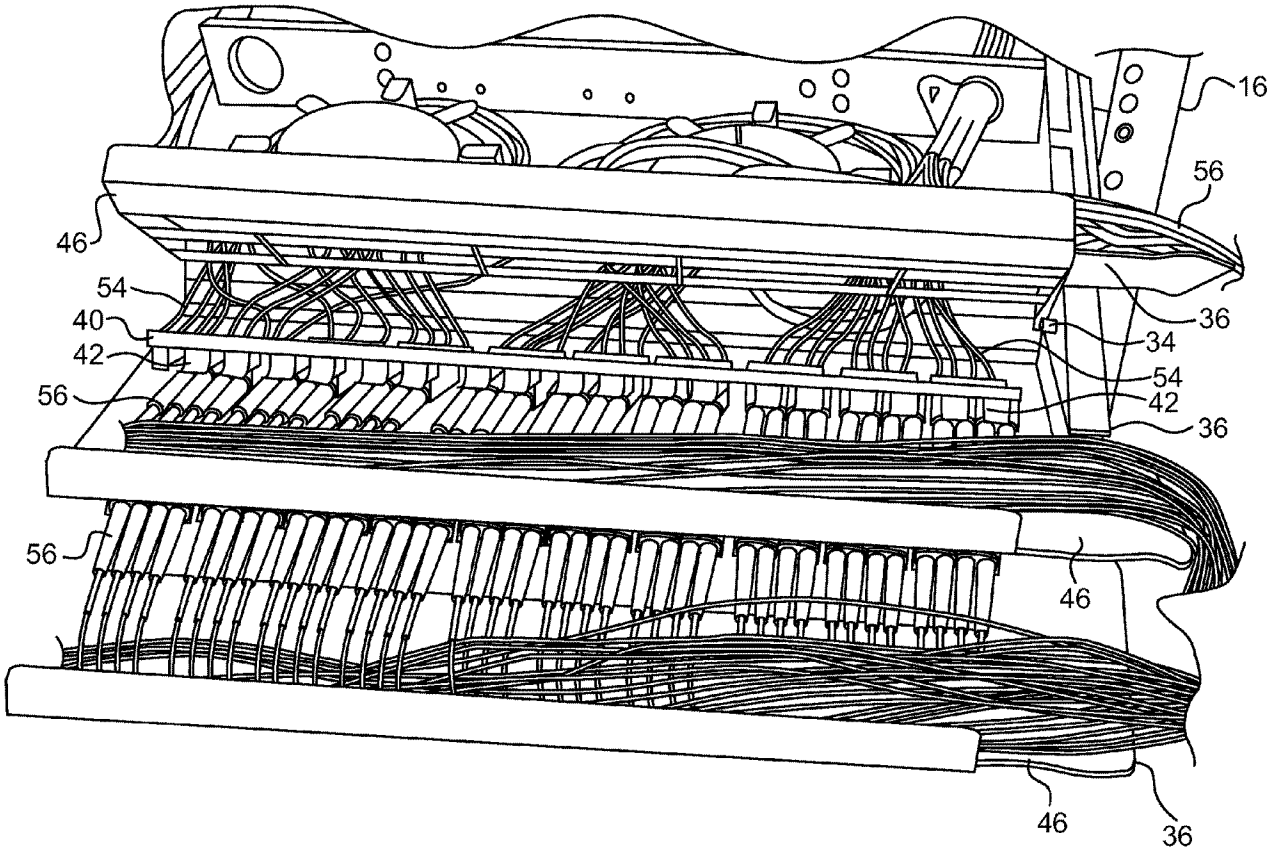
FIG. 6 is a perspective view of the shelf of FIG. 1 mounted in a rack and a plurality of associated cables and patch cords.

FIG. 6 illustrates a plurality of optical fibers 54 connected to communication adapters 42 on the side of communication adapters 42 facing tray rear wall 30 and a plurality of patch cords 56 connected to the opposite side of the communications adapters 42. As will be appreciated from FIG. 6, these patch cords are supported by troughs 46 and run along troughs 46 toward the side of the rack 16. FIG. 6 shows the middle panel 36 and top panel 36 in their raised positions, and in this configuration, a user can readily access the patch cords 56 and/or communications adapters 42 in each of the panels 36. When spaced in this manner, additional surface area is also exposed for labeling the individual communication adapters 42. When the panels 36 are lowered to the position illustrated in FIG. 1, the communications adapters 42 are located very close to one another. This relative proximity does not affect the operation of the communications adapters 42, but would make it difficult or impossible to inert or remove individual patch cords 56. By separating the middle and top panels 36, the communications adapters 42 become easier to access. Thus, FIG. 1 illustrates the high-density, space saving, configuration of the adapters when tray 20 is in the retracted or storage position in rack 16, and FIG. 2 illustrates the extended configuration of tray 20 in which the middle and upper panels 36 are pivoted away from the lower panel 36 to provide greater access to the communications adapters 42 when the tray 20 is pulled out of rack 16.

While a fixed bottom panel 36 is described above, bottom panel 36 could also be pivotably mounted to tray 20 for use in settings where the ability to move bottom panel 36 away from tray 20 could provide improved access to the communications adapters on bottom panel 36. Alternately, when there is no need to move the communication adapters 42 located beneath the middle panel 36, the communications adapters 42 could be mounted directly to tray 20 in the same location where the communication adapters 42 of bottom panel 36 would be found. However, the use of a non-pivoting bottom panel 36 allows for the use of a number of identical parts (the panels 36) for holding communication adapters 42 rather than providing an alternate holder on tray 20 for the communications adapters 42 and also makes the communications adapters 42 mounted in such a bottom panel 36 readily removable as a unit. In addition, the above embodiment includes three panels, each of which supports a single row of communication adapters. More or fewer panels could be used in situations where warranted, and each panel could be configured to hold more than one row of communication adapters 42 if the nature of the communications adapters used made this desirable. Furthermore, while three panels mounted above tray 20 are illustrated, the three panels could alternately be mounted beneath tray 20 so as to pivot downwardly when tray 20 is extended from rack 16, or a first panel 36 could be mounted above tray 20 so as to pivot upwardly while a second panel 36 could be mounted beneath tray 20 so as to pivot downwardly when the tray 20 is pulled out of rack 16.

Figure 7:
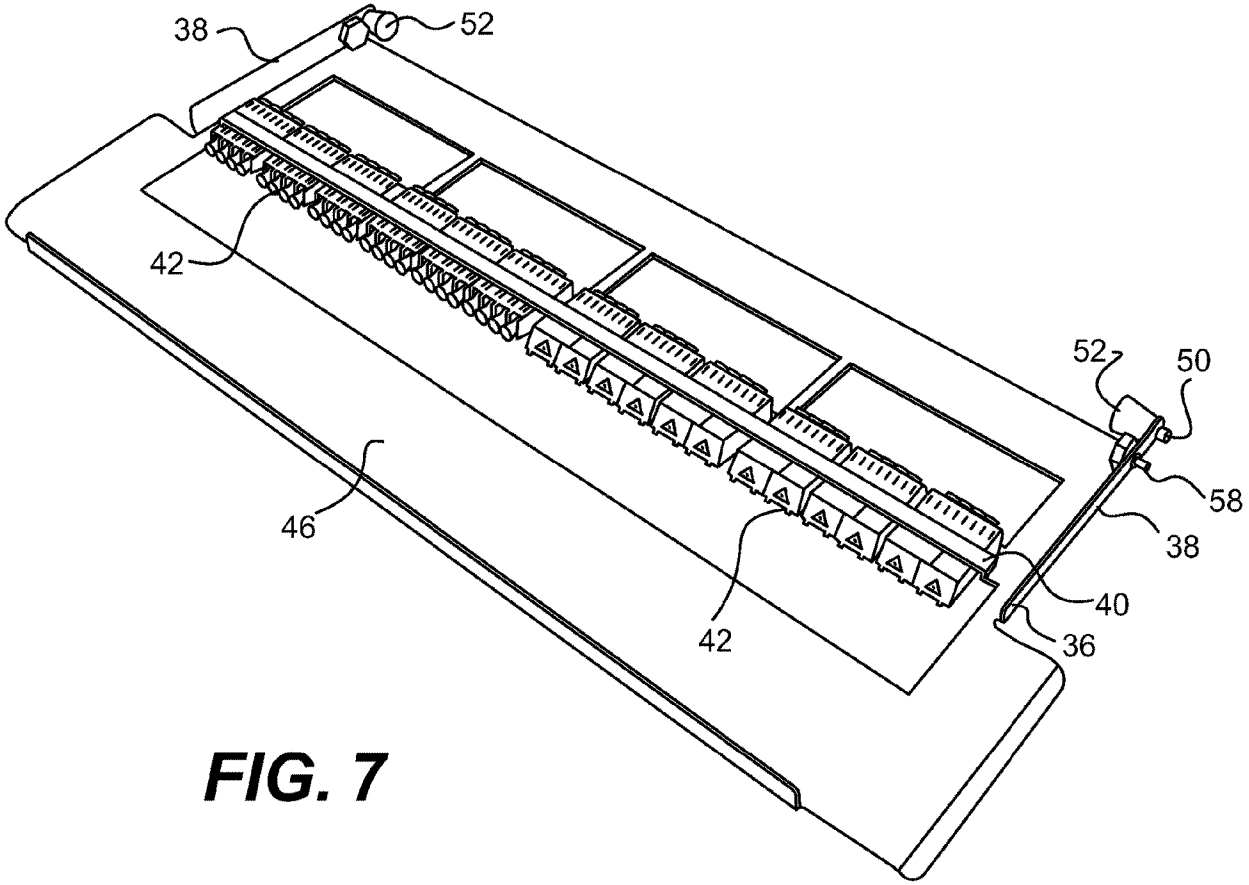
FIG. 7 is a perspective view of an embodiment of a panel for use in the shelf of FIG. 1 with two different types of adapters mounted therein.
Figure 8:
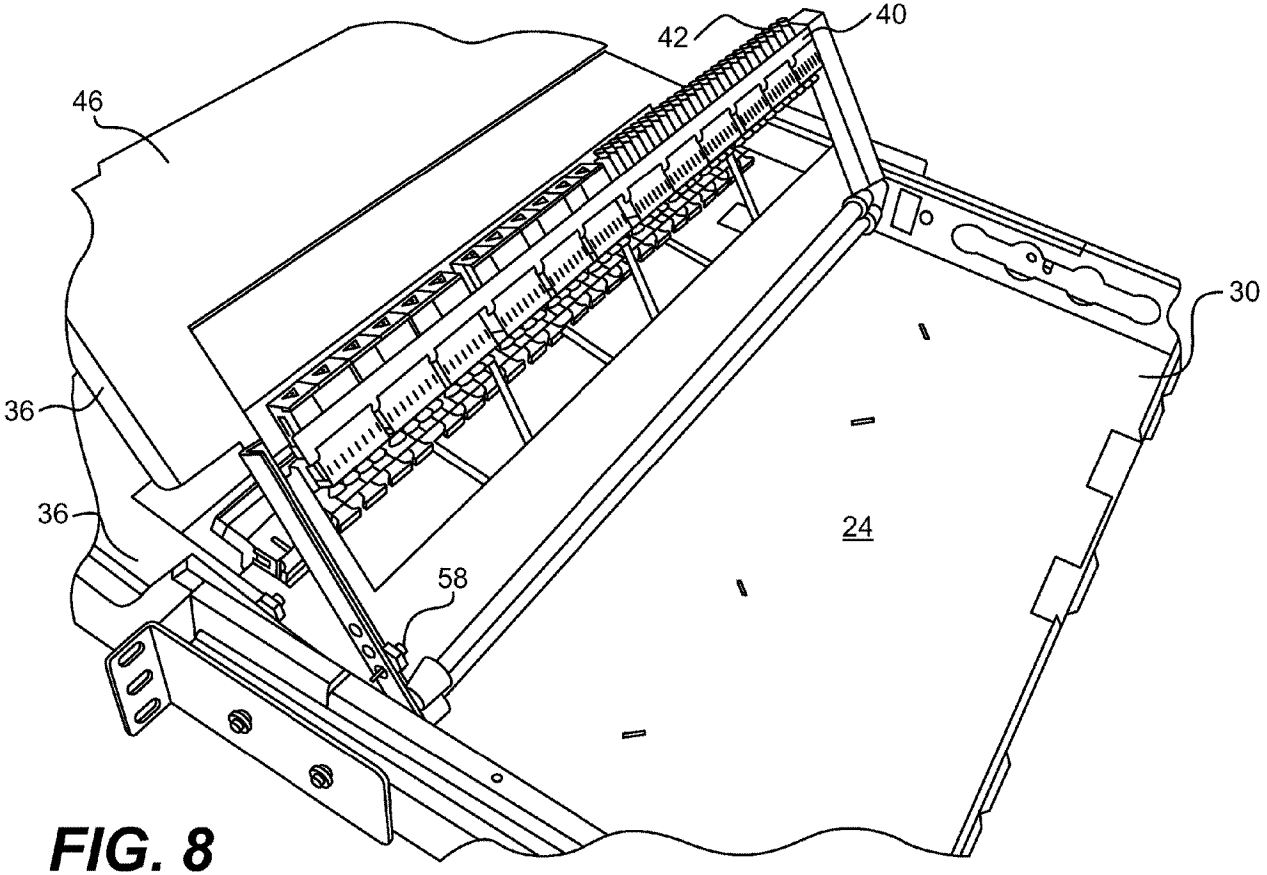
FIG. 8 is a perspective view of the panel of FIG. 7 mounted on the shelf of FIG. 1.

A modification to top panel 36 is illustrated in FIGS. 7 and 8 in which each of panel first and second arms 38 include [a] *first or second stops, like first or second* spring-biased retaining [pin] *pins* 58 adjacent to pivot pin 50. [Retaining] *Each retaining* pin 58 is biased toward the position illustrated in FIG. 7. To raise top panel 36, the *first* retaining pins 58 are retracted to allow the top panel to pivot away from the middle panel 36 and the *first* retaining pins 58 are then released. In this extended position, the *first* retaining pins 58 come to rest on top of tray sidewalls 28 to hold the top panel 36 in a raised position. The middle panel 36 is held in its raised position in a similar manner using its own *second* retaining [pin] *pins* (not illustrated).

Figure 9:
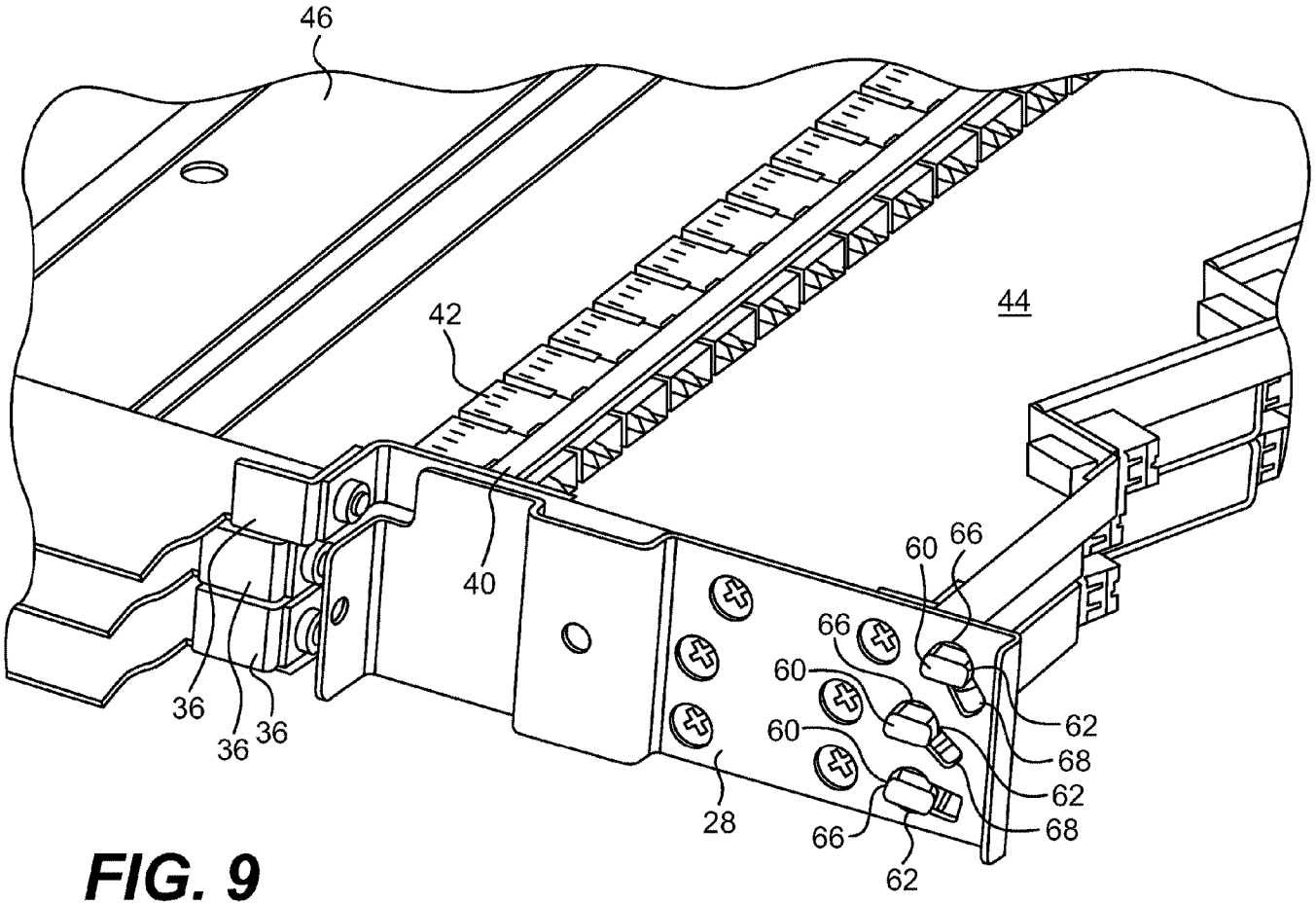
FIG. 9 is a perspective view of a plurality of modified panels connected to a modified version of the shelf of FIG. 1, the panels being shown in a lowered position.
Figure 10:
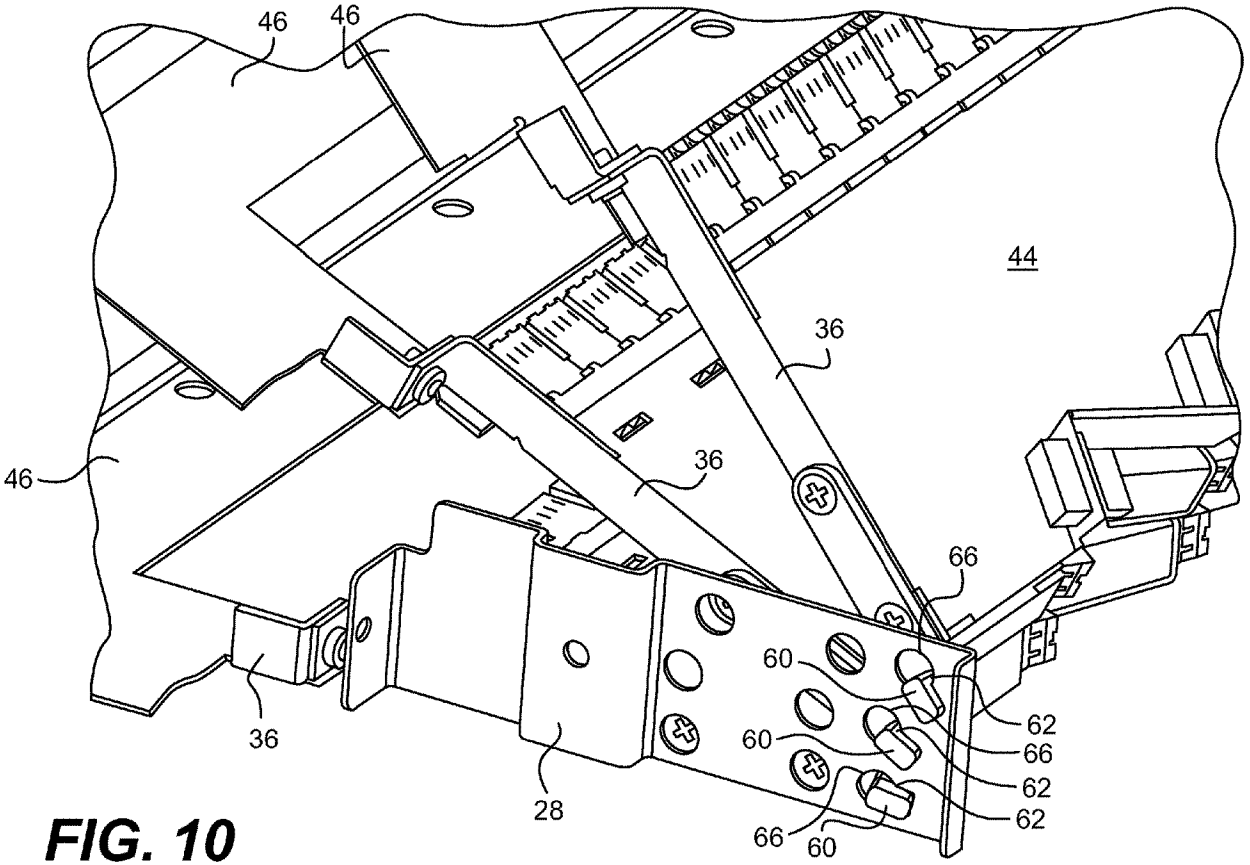
FIG. 10 is a perspective view of the modified panels of FIG. 9 shown in a raised position.

A further arrangement for maintaining a given angular relationship between a plurality of panels 36 is illustrated in FIGS. 9 and 10. In this embodiment, first and second arms 38 are provided with keys 60 which are received in keyholes 62 in a modified sidewall 28 of tray 20. Keyholes 62 include a generally circular portion 66 in which keys 60 can freely rotate and a linear portion 68. Keys 60 will align with linear portions 68 when a panel 36 is in a preselected, desired angular position and the keys 60 may then be inserted into linear portions 68. Keys 60 cannot rotate when located in linear portions 68 of the keyholes 62, and panels 36 are thus maintained in the desired angular position to access the adapters/jacks. Panels 36 may be returned to their storage positions by removing keys 60 from the linear portion 68 by pulling panels 36 away from the linear portions 68 and returning keys 60 to the circular portions wherein they can rotate.

The present invention has been described herein in terms of several embodiments. Additions and modifications to these embodiments will become apparent to those of ordinary skill in the relevant art upon a reading of the foregoing description. It is intended that all such modifications and additions comprise a part of the present invention to the extent they fall within the scope of the several claims appended hereto.

What is claimed is:

1. A communication patching system comprising:

a platform configured to support a plurality of cables, the platform including a bottom and spaced apart first and second sidewalls that extend upward from said bottom;

a first holder connected to said platform and configured to hold a first row of communications adapters;

a first set of communications adapters mounted to said first holder;

a second holder configured to hold a second row of communications adapters on top of said first holder;

a second set of communications adapters mounted to said second holder;

a first pivot directly pivotably attaching said second holder to said first sidewall of said platform;

a second pivot directly pivotably attaching said second holder to said second sidewall of said platform, wherein said first and second pivots define a pivot axis of said second holder, and wherein the pivot axis of said second holder passes through said first and second sidewalls above a plane of said bottom of said platform, such that said second holder can pivot from a first position to a second position and thereby said second row of communications adapters moves from a first position a first distance from said first row of communications adapters to a second position a second distance from said first row of communications adapters, said second distance being greater than said first distance; and means for releasably holding said second row of communications adapters in said second position.

2. The communication patching system of claim 1, including a trough connected to said second holder, a first plurality of cables on said platform connected to a first side of said second set of communications adapters and a second plurality of cables on said trough connected to a second side of said second set of communications adapters.

3. The communication patching system of claim 1 wherein said means for [moving said second row of communications adapters] *releasably holding said second row of communications adapters in said second position* comprises:

*said first pivot including* a first key attached to said second holder, wherein said first key extends into a first keyhole in said first sidewall, and wherein said first keyhole includes a generally circular portion in which said first key can freely rotate, and

*said second pivot including* a second key attached to said second holder, wherein said second key extends into a second keyhole in said second sidewall, and wherein said second keyhole includes a generally circular portion in which said second key can freely rotate.

4. A communication patching system comprising:

a drawer having a bottom, a front portion, a rear portion, a first sidewall extending upward from said bottom, and a second sidewall, spaced from said first sidewall and extending upward from said bottom, wherein said first and second sidewalls reside in an area between said front portion of said drawer and said rear portion of said drawer;

a first panel attached to said first and second sidewalls of said drawer, said first panel having a front, a rear, a first side residing in an area between said front of said first panel and said rear of said first panel, a second side residing in an area between said front of said first panel and said rear of said first panel, and a first bulkhead configured to receive a first set of communications connectors;

a first pivot directly pivotably attaching said first side of said first panel to said first sidewall of said drawer;

a second pivot directly pivotably attaching said second side of said first panel to said second sidewall of said drawer, wherein said first and second pivots define a pivot axis of said first panel, and wherein the pivot axis of said first panel passes through said first and second sidewalls above a plane of said bottom of said drawer; and a second bulkhead configured to receive a second set of communications connectors, wherein said second bulkhead is directly or indirectly connected to said drawer, wherein said first panel is pivotable along said pivot axis of said first panel via said first pivot and said second pivot between a first position and a second position, wherein said first bulkhead is spaced from said second bulkhead by a first distance when said first panel is in said first position, wherein said first bulkhead *is raised above said second bulkhead and* is spaced from said second bulkhead by a second distance when said first panel is in said second position, and wherein said second distance is greater than said first distance.

5. The communication patching system of claim 4, further comprising:

a second panel attached to said first and second sidewalls of said drawer, said second panel having a front, a rear, a first side residing in an area between said front of said second panel and said rear of said second panel, a second side residing in an area between said front of said second panel and said rear of said second panel, and a third bulkhead configured to receive a third set of communications connectors, wherein said second panel overlies said first panel and is pivotable between a third position and a fourth position.

6. The communication patching system of claim 5, wherein said first, second and third [holders] *bulkheads* form a stack when said first panel is in said first position and said third panel is in said third position.

7. The communication patching system of claim 6, further comprising:

a first stop for holding said first panel in said second position; and a second stop for holding said second panel in said fourth position.

8. The communication patching system of claim 4, wherein said first pivot is located adjacent to said rear of said first panel and attached to said first sidewall of said drawer at a location between said front portion of said drawer and said rear portion of said drawer, and wherein said first sidewall is located at a first side edge of said bottom of said drawer.

9. The communication patching system of claim 8, wherein said first pivot includes a pin extending into a first opening in said first sidewall of said drawer, and wherein said first pivot includes a pull which allows for retraction of said pin from said first opening in said first sidewall of said drawer so that said first panel may be removed from said drawer.

10. The communication patching system of claim 8, wherein said first pivot includes a first key which extends into a first keyhole in said first sidewall of said drawer, and wherein said first keyhole includes a generally circular portion in which said first key can freely rotate, and wherein said second pivot includes a second key which extends into a second keyhole in said second sidewall of said drawer, and wherein said second keyhole includes a generally circular portion in which said second key can freely rotate.

11. The communication patching system of claim 10, wherein said first keyhole include a first linear portion, wherein said first key may be inserted into said first linear portion in which said first key may not freely rotate, wherein said second keyhole include a second linear portion, wherein said second key may be inserted into said second linear portion in which said second key may not freely rotate, and wherein when said first and second keys are in said first and second linear portions, said first panel is stopped in said second position.

12. The communication patching system of claim 4, further comprising:

a stop for holding said first panel in said second position.

13. The communication patching system of claim 12, wherein said stop includes a plunger attached to said first sidewall of said drawer and selectively extendable into a space beneath said first panel to support said first panel in said second position.

14. The communication patching system of claim 12, wherein said stop includes a moveable pin attached to said first panel and selectively extendable to a position outward of said first side of said first panel to engage said first sidewall of said drawer when said first panel is in said second position.

15. The communication patching system of claim 4, wherein said first bulkhead is configured to present the first set of communications connectors in a first row extending in a first direction, and wherein said pivot axis of said first panel is substantially parallel to said first direction.

16. The communication patching system of claim 15, wherein said second bulkhead is configured to present the second set of communications connectors in a second row extending in a second direction, and wherein said pivot axis of said first panel is substantially parallel to said second direction.

17. The communication patching system of claim 4, wherein said first bulkhead is configured to present the first set of communications connectors in only a first row.

18. A communication patching system comprising:

a drawer having a bottom, a front portion, a rear portion, a first sidewall extending upward from said bottom, and a second sidewall spaced from said first sidewall and extending upward from said bottom, wherein said first and second sidewalls reside in an area between said front portion of said drawer and said rear portion of said drawer;

a first panel attached to said first and second sidewalls of said drawer, said first panel having a front, a rear, a first side residing in an area between said front of said first panel and said rear of said first panel, a second side residing in an area between said front of said first panel and said rear of said first panel, and a first bulkhead presenting first holders for a single layer of adapters;

a single layer of *LC duplex* adapters populated into said first holders, *wherein each LC duplex adapter has a SC simplex adapter footprint*;

optical fibers extending into backsides of said single layer of adapters on a backside of said bulkhead;

patch cords connected to front sides of said single layer of adapters on a front side of said first bulkhead;

a first pivot directly pivotably attaching said first side of said first panel to said first sidewall of said drawer;

a second pivot directly pivotably attaching said second side of said first panel to said second sidewall of said drawer, wherein said first and second pivots define a pivot axis of said first panel, and wherein the pivot axis of said first panel passes through said first and second sidewalls above a plane of said bottom of said drawer; and a second bulkhead presenting second holders for a single layer of adapters, wherein said second bulkhead is directly or indirectly connected to said drawer, wherein said first panel is pivotable along said pivot axis of said first panel via said first pivot and said second pivot between a first position and a second position, wherein said first bulkhead is spaced from said second bulkhead by a first distance when said first panel is in said first position, wherein said first bulkhead is spaced from said second bulkhead by a second distance when said first panel is in said second position, and wherein said second distance is greater than said first distance.

19. The communication patching system of claim 18, further comprising:

a stop for holding said first panel in said second position.

20. The communication patching system of claim 18, further comprising:

a second panel attached to said first and second sidewalls of said drawer, said second panel having a front, a rear, a first side residing in an area between said front of said second panel and said rear of said second panel, a second side residing in an area between said front of said second panel and said rear of said second panel, and a third bulkhead presenting third holders for a single layer of adapters, wherein said second panel overlies said first panel and is pivotable between a third position and a fourth position;

a first stop for holding said first panel in said second position; and a second stop for holding said second panel in said fourth position.

*21. A communication patching system comprising:*

*a drawer having a bottom, a front portion, a rear portion, a first sidewall extending upward from said bottom, and a second sidewall, spaced from said first sidewall and extending upward from said bottom, wherein said first and second sidewalls reside in an area between said front portion of said drawer and said rear portion of said drawer;*

*a first panel attached to said first and second sidewalls of said drawer, said first panel having a front, a rear, a first side residing in an area between said front of said first panel and said rear of said first panel, a second side residing in an area between said front of said first panel and said rear of said first panel, and a first bulkhead configured to receive a first set of communications connectors in the form of LC duplex adapters having a SC simplex adapter footprint;*

*a first pivot directly pivotably attaching said first side of said first panel to said first sidewall of said drawer;*

*a second pivot directly pivotably attaching said second side of said first panel to said second sidewall of said drawer, wherein said first and second pivots define a pivot axis of said first panel, and wherein the pivot axis of said first panel passes through said first and second sidewalls above a plane of said bottom of said drawer; and*

*a second bulkhead configured to receive a second set of communications connectors in the form of LC duplex adapters having a SC simplex adapter footprint, wherein said second bulkhead is directly or indirectly connected to said drawer, wherein said first panel is pivotable along said pivot axis of said first panel via said first pivot and said second pivot between a first position and a second position, wherein said first bulkhead is spaced from said second bulkhead by a first distance when said first panel is in said first position, wherein said first bulkhead is spaced from said second bulkhead by a second distance when said first panel is in said second position, and wherein said second distance is greater than said first distance.*

*22. The communication patching system of claim 21, wherein said patching system has a fiber port density of at least ninety-six (96) fibers per 1 U space.*

*23. The communication patching system of claim 22, wherein the fiber port density is formed entirely by LC duplex adapters.*

*24. The communication patching system of claim 22, wherein the fiber port density is one hundred forty-four (144) fibers per 1 U space.*

*25. The communication patching system of claim 24, wherein the fiber port density is formed by seventy-two (72) LC duplex adapters.*

*26. The communication patching system of claim 21, further comprising:*

*plural LC duplex adapters, each having a SC simplex adapter footprint, mounted to said first and second bulkheads;*

*optical fibers extending into backsides of said plural LC duplex adapters on backsides of said first and second bulkheads; and*

*patch cords connected to front sides of said LC duplex adapters on front sides of said first and second bulkheads.*

*27. The communication patching system of claim 26, wherein said patching system has a fiber port density of at least ninety-six (96) fibers per 1 U space.*

*28. The communication patching system of claim 27, wherein the fiber port density is one hundred forty-four (144) fibers per 1 U space.*

* * * * *